United States Patent
Kajitani

[15] 3,680,992
[45] Aug. 1, 1972

[54] CAKE STOCK DISPENSING APPARATUS

[72] Inventor: Tadahiro Kajitani, 288-28 Oaza-Anyoji Ritto-cho, Kurita-gun, Shiga Pref., Japan

[22] Filed: Nov. 25, 1970

[21] Appl. No.: 92,675

[52] U.S. Cl.....................................425/167, 425/382
[51] Int. Cl..............................................A21c 11/16
[58] Field of Search...31/9, 13, 14; 107/14 B, 14 BA, 107/1 D, 27 R, 27 A; 141/250–262

[56] References Cited

UNITED STATES PATENTS

| | | | |
|---|---|---|---|
| 1,121,432 | 12/1914 | Westerman | 107/1 D |
| 249,227 | 11/1881 | Dosh | 107/27 R |
| 1,939,400 | 12/1933 | Lerche | 107/27 R |
| 2,709,974 | 6/1955 | Hauter et al. | 107/14 R X |
| 2,712,693 | 7/1955 | Comparette | 107/14 R X |
| 1,303,599 | 5/1919 | Sallerno | 107/1 D X |

Primary Examiner—Jordan Franklin
Assistant Examiner—G. V. Larkin
Attorney—Dawson, Tilton, Fallon & Lungmus

[57] ABSTRACT

A cake stock dispensing apparatus in which a depressing plate is provided in a cake stock container which has a number of openings adapted to extrude a certain quantity of cake stock in the bottom thereof, the openings being controlled by a shutter. The apparatus further has a liftable supporting plate below the openings for removably supporting a disk thereof, the latter being adapted to receive the cake stock extruded through the openings.

Further, the apparatus is provided with means for driving said shutter, depressing plate and supporting plate with the disk in properly timed relation with each other, said means being perfectly controlled by an electrical control circuit.

1 Claim, 7 Drawing Figures

CAKE STOCK DISPENSING APPARATUS

The invention relates to a dispensing apparatus adapted to press out a cake stock such as for rolled sponge cake, cream puff coating, cupped-cake, marshmallow and the like through openings to provide lumps of predetermined size.

A main object of the present invention is to provide an improved dispenser which is capable of automatically pressing out a number of lumps of such cake stock at a stroke onto a lump receiving plate over the entire surface thereof in a single operation.

Another object of the present invention is to provide an automated cake stock dispenser comprising a pressing-out means for pressing out said stock through openings, means for opening and closing a shutter provided over said openings and means for moving a receiving plate to the vicinity of the openings so as to assure the timely reception of the lumps being extruded through said openings while keeping them in shape and wherein said means are so adapted that they are fully automatically operated in relation to each other by combination with the electrical system, thus making it possible to obtain a number of cakes at the same time and continuously.

The other objects and many of the attendant advantages of the invention will be readily appreciated as the same becomes better understood by reference to the following detailed description when considered in connection with the accompanying drawings wherein.

Figure 1:
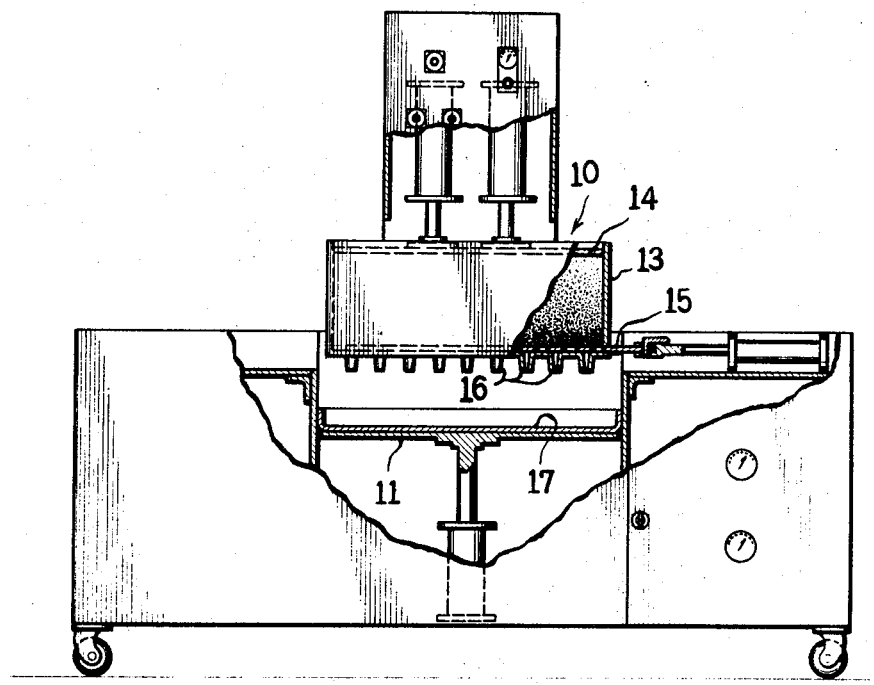
FIG. 1 is a partially sectioned, front elevational view of a fully automated cake stock dispensing apparatus according to the present invention.
Figure 2:
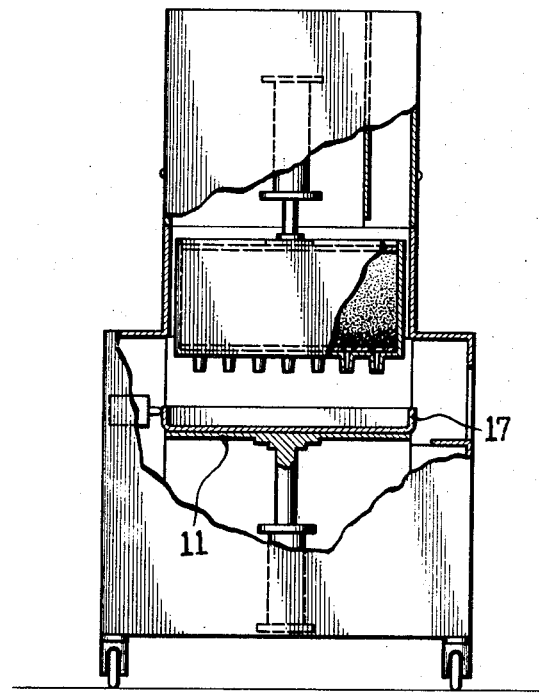
FIG. 2 is a partially sectioned, side elevational view of the cake stock dispensing apparatus.

Referring now to the drawings, a cake stock dispenser according to the present invention is composed basically of a pressing-out mechanism 10 for pressing out a number of lumps of a cake stock at a stroke and a supporting plate 11 for removably supporting a disk 17 on which the lumps to be extruded are received.

As shown in FIG. 1, the pressing-out mechanism 10 comprises an open-topped stock container 13 having a number of openings or nozzles 16 adapted to extrude a certain quantity of cake stock formed in the bottom thereof, a depressing plate 14 for depressing a cake stock contained in the container, a shutter 15 provided on the lower surface of said container 13. Said plate 11 is vertically movably supported below the openings 16. Thus, the stock contained in the container 13 is pressed down by the depressing plate 14 when the shutter 15 is opened so that a predetermined amount of the stock is pressed out in the form of lumps through the openings 16 onto the receiving disk 17 over the entire surface thereof which has just been lifted with the supporting plate 11 to the vicinity of the openings. The aforesaid mutually associated movements of the depressing plate 14, shutter 15 and supporting plate 11 will now be described in more detail with reference to drawings.

Figure 7:
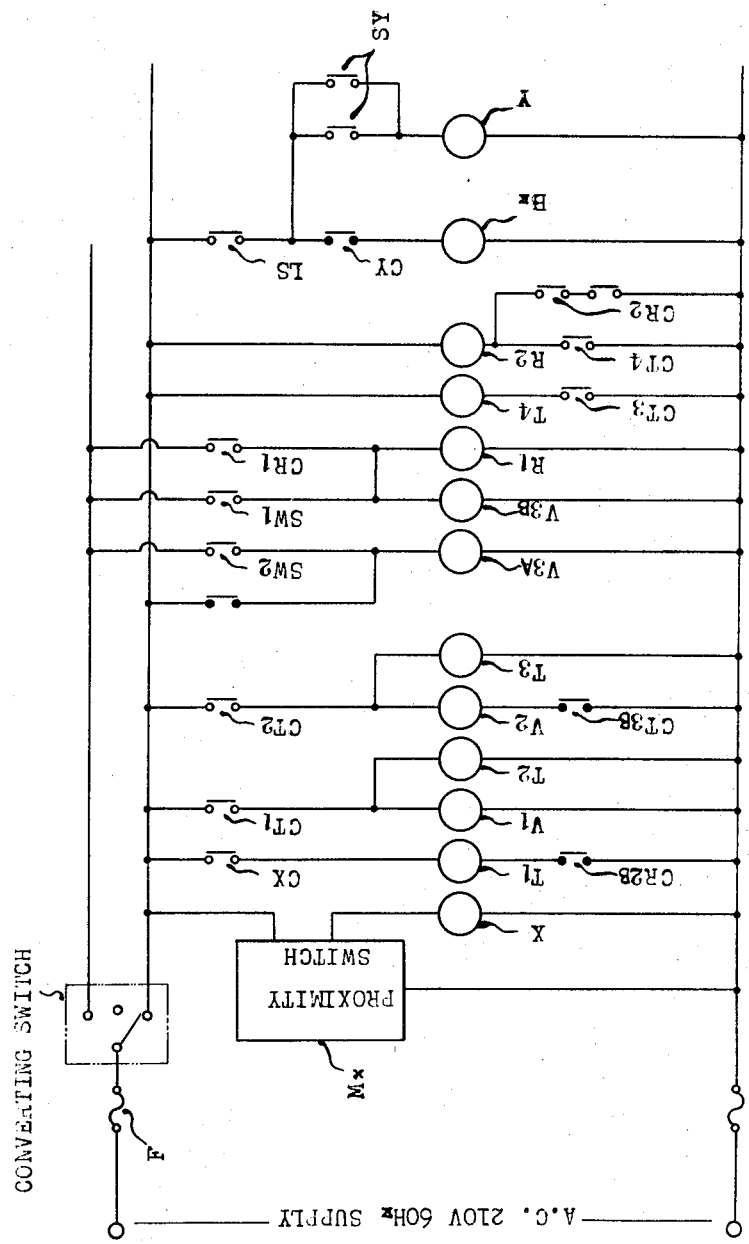
FIG. 7 is an electrical control circuit for controlling movement of movable components of the cake stock dispensing apparatus according to the present invention.

Illustrated in FIG. 7 is an electrical control circuit according to the present invention for controlling magnetic valves of the fluid pressure equipments. Said circuit is provided with an automatic channel and a manual channel. In the FIG. 7, X, $R_1$, $R_2$ and Y are relays, $T_1$, $T_2$, $T_3$ and $T_4$ being timers, COS being converting switch. Designated at $V_1$ is a first magnetic valve for actuating a first cylinder 20, the latter having a piston 21 connected with the supporting plate 11. Designated at $V_2$ is a second magnetic valve of a second cylinder 22 for the shutter 15, the second cylinder 22 having a piston 23 connected with the shutter. Designated at $V_{3A}$ is a third magnetic valve of a third cylinder 24 having a piston 25, and $V_{3B}$ is a fourth magnetic valve of a fourth cylinder 26 having a piston 27, said pistons 25 and 27 being connected with the depressing plate 14. Designated at Mx is a proximity switch for detecting the motion of the supporting plate 11.

Figure 4:
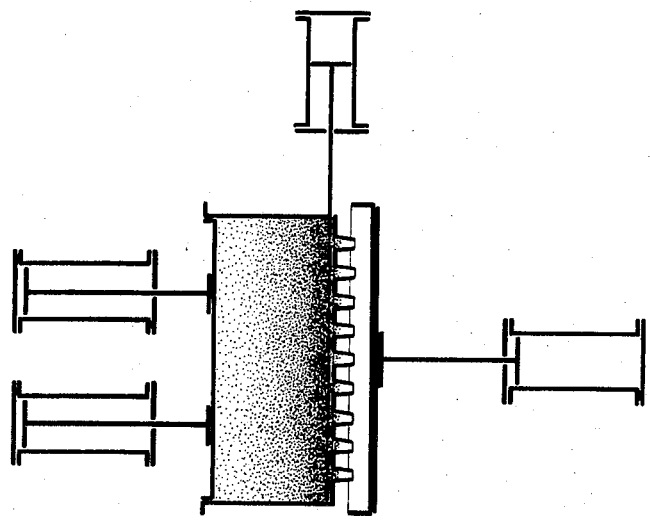
FIGS. 3 to 6 are diagrammatic fragmentary views illustrating stages of operation of the cake stock dispensing apparatus according to the present invention.
Figure 3:
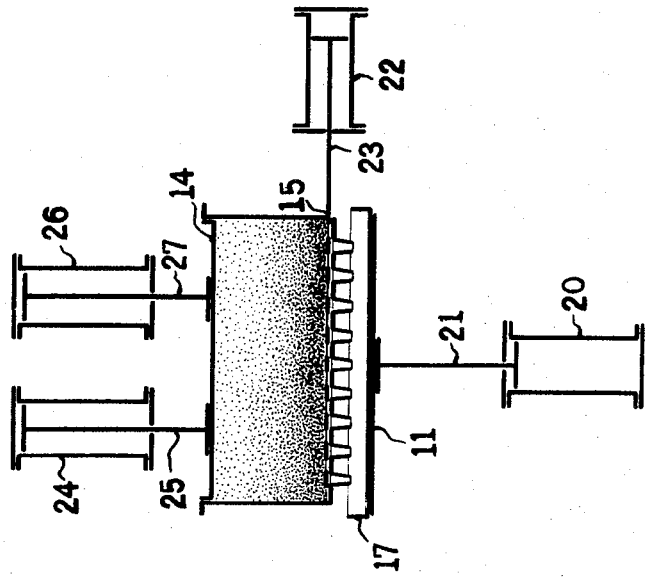
Figure 6:
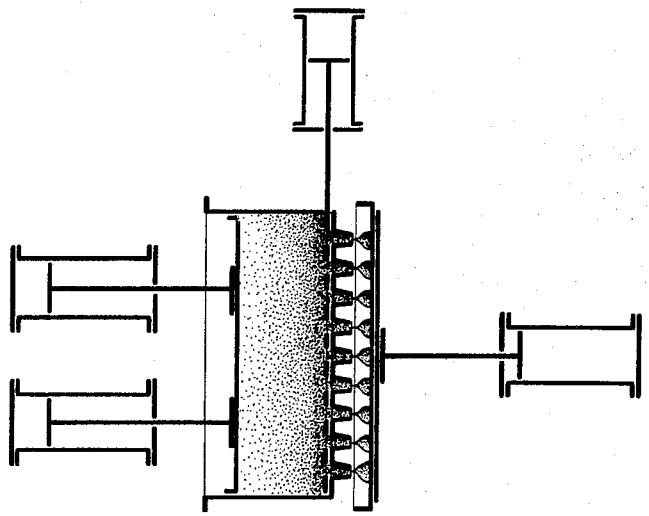
Figure 5:
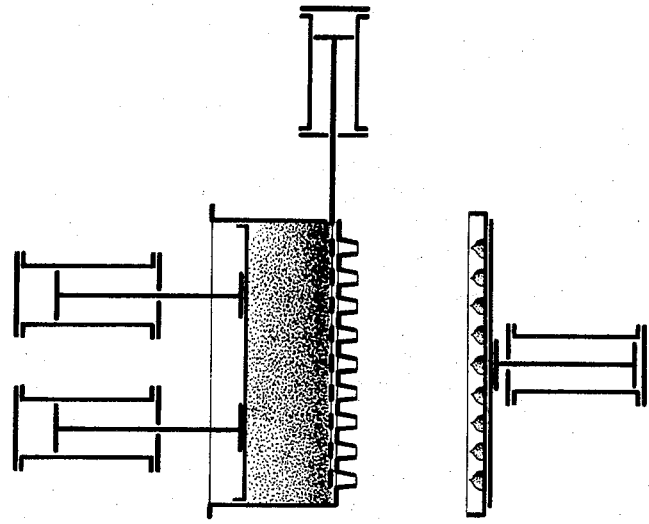

In FIG. 7, the converting switch COS is switched to the automatic channel for supplying bias voltage to the control circuit. Then, the disk 17 is mounted on the supporting plate 11, thereby biasing the relay X by the proximity switch Mx. Thereby, upon function of the relay X, contact points CX become in connection, and the timer $T_1$ is started. When the period exceeds predetermined time, contact points $CT_1$ are closed due to the action of the timer $T_1$ so that the magnetic valve $V_1$ and the timer $T_2$ are biased. Said valve $V_1$, thus, allows flow of compressed air into the first cylinder 20 whereby the latter lifts the supporting plate 11 with the disk 17 up to the predetermined position as shown in FIG. 3. After exceeding the predetermined period, the contact points $CT_2$ are closed by action of the timer $T_2$ so that the magnetic valve $V_2$ and the timer $T_3$ are biased. Thus the valve $V_2$ allows flow of the compressed air into the second cylinder 22, whereby the shutter 15 is moved to the open position as shown in FIG. 4.

In this condition, since the magnetic valve $V_{3A}$ has been biased when the converting switch COS has been switched to the automatic channel, the magnetic valve $V_{3A}$ of the third cylinder 24 will be in open condition so that the depressing plate 14 is always depressed downwardly and in constant pressure by the third cylinder 24.

Thus, when the shutter 15 is opened the stock contained in the container 13 is pressed out in the form of lumps 30 through the openings 16 onto the receiving disk 17 over the entire surface thereof which has been lifted with supporting plate 11 to the vicinity of the openings. It will be understood that amount or size of the lumps may be determined by period of the open position of the shutter 15. In this embodiment, the period of the open position of the shutter 15 is 2 seconds.

The disk 17 on which the lumps have just been supplied is manually removed whereby the circuit of the automatic channel is in "OFF" condition by change of the proximity switch Mx. Then, another new disk is mounted on the supporting plate 11, and the same operation as mentioned hereinbefore is repeated.

Finally, when the depressing plate has reached the lowermost position thereof a limit switch Ls serves to ring a buzzer Bz which is capable of being stopped manually by a switch SY. Upon switching on the switch SY, the relay Y is biased to release contact points CY thereby cutting off the buzzer Bz from the Ac source. The converting switch COS, then, is switched to the manual channel and the fourth cylinder 26 is actuated as follows.

A pushing switch $SW_1$ is closed to bias the magnetic valve $V_{3B}$ and relay $R_1$ so that the relay $R_1$ is in actuating condition due to the closure of contact points $CR_1$. Thereby, upon operating the relay $R_1$, the magnetic valve $V_{3B}$ is opened to allow flow of the compressed air into the fourth cylinder 26, and the latter lifts the depressing plate 14 up to the predetermined position or starting position. In FIG. 7, $Sw_2$ is a pushing switch for biasing the magnetic magnetic valve $V_{3A}$ of the third cylinder 24.

An outline of the present invention has so far been described. To sum up, in the present invention, a cake stock is charged in the container 13 having a number of openings formed in the bottom thereof and associated with the shutter, and the depressing plate is caused to press the stock so that a number of lumps are pressed out at a stroke through said openings onto a lump receiving disk positioned therebelow and supported on the supporting plate. By virtue of the aforementioned arrangement, it is possible for any person to produce a number of standardized highly accurate undried cakes at a time by merely pushing the starting button or converting switch. Further, since the receiving disk is raised to a position immediately below the openings at the time of pressing-out, the extruded lumps can be dependably received thereon without any possibility of causing deformation thereof. Particularly, in the present invention, there is obtained a great advantage in that the operations of the opening and closing of the shutter, the lowering of the depressing plate and the raising and lowering of the receiving plate can be automatically effected in properly timed relation by energizing the electric circuit by means of the switch without requiring any troublesome operation of the parts, so that even any unskilled operator may easily operate the machine to continuously produce cakes in large quantities.

The subject invention in its broader aspects is not limited only to the specific embodiments shown and described but departures may be made therefrom within the scope of the accompanying claim without departing from the principles of the invention and without sacrificing its chief advantages.

What I claim is:

1. A cake stock dispensing apparatus comprising a cake stock container having a number of openings in the bottom thereof, a shutter for opening and closing said openings, a depressing plate in said container for downwardly urging cake stock contained in the container, a vertically movable supporting plate positioned below said openings and a disk supported on the supporting plate, said disk being adapted to receive lumps of cake stock extruded through the openings, a first cylinder operatively connected to the supporting plate for raising and lowering the supporting plate, a second cylinder operatively connected to the shutter for moving the shutter relative to the openings in the container, third and fourth cylinders operatively connected to the depressing plate for raising and lowering the depressing plate, proximity switch means associated with the supporting plate for sensing the positioning and the removal of the disk on the supporting plate, an electrical control circuit for operating the first, second and third cylinders in timed relation when the proximity switch is closed by positioning the disk on the supporting plate, limit switch means associated with the depressing plate for signaling the lowering of the depressing plate to its lowermost position, and switch means associated with the fourth cylinder for raising the depressing plate.

* * * * *